April 13, 1937.　　A. W. POPE, JR　　2,076,590
INTERNAL COMBUSTION ENGINE
Filed Aug. 22, 1928　　4 Sheets-Sheet 1

Inventor
Arthur W. Pope, Jr.
By Brown, Jackson, Boettcher
& Dienner,
Attys.

April 13, 1937. A. W. POPE, JR 2,076,590
INTERNAL COMBUSTION ENGINE
Filed Aug. 22, 1928 4 Sheets-Sheet 2

Inventor
Arthur W. Pope, Jr.
By Brown, Jackson, Boettcher & Dienner.
Attys

April 13, 1937.   A. W. POPE, JR   2,076,590
INTERNAL COMBUSTION ENGINE
Filed Aug. 22, 1928   4 Sheets-Sheet 3

Inventor
Arthur W. Pope, Jr.
By Brown, Jackson, Boettcher & Dienner,
Attys.

April 13, 1937.  A. W. POPE, JR  2,076,590
INTERNAL COMBUSTION ENGINE
Filed Aug. 22, 1928   4 Sheets-Sheet 4

Inventor
Arthur W. Pope, Jr.
By Brown, Jackson, Boettcher & Dienner,
Attys

Patented Apr. 13, 1937

2,076,590

UNITED STATES PATENT OFFICE 2,076,590

INTERNAL COMBUSTION ENGINE

Arthur W. Pope, Jr., Waukesha, Wis., assignor to Waukesha Motor Company, Waukesha, Wis., a corporation of Wisconsin Application August 22, 1928, Serial No. 301,346

17 Claims. (Cl. 123—191)

This invention relates to internal combustion engines, and more particularly to the combustion chamber and the appurtenances thereof.

My invention has to do with means for shielding the exhaust valve against the hot exhaust gases, during the exhaust stroke, and from the general turbulence in the combustion chamber during the intake and compression strokes. A further object of my invention is to provide a shielded area or space in the combustion chamber and means for igniting the charge in such space, whereby smoother operation is obtained than is possible where the charge is ignited in the main combustion chamber.

Further objects and advantages of my invention will appear from the detailed description.

Figure 1:
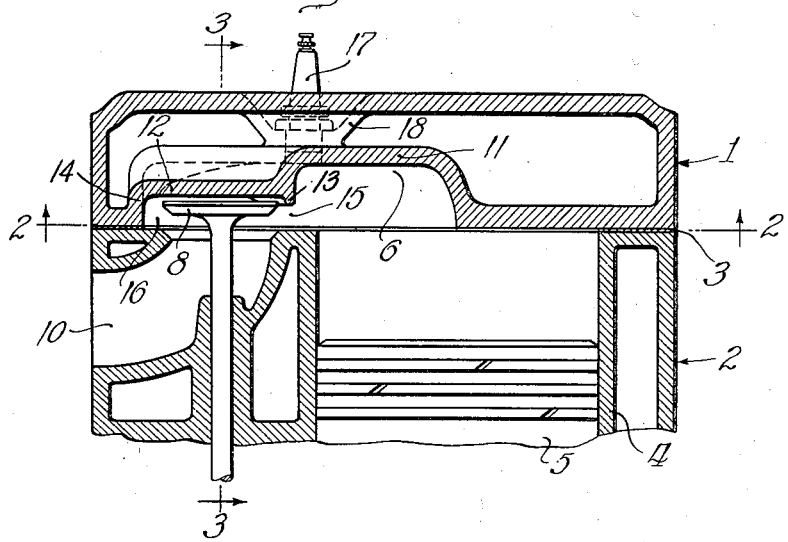
Fig. 1 is a fragmentary vertical sectional view through the head and the cylinder block of an engine, in accordance with my invention.

Head 1 is suitably secured upon the upper end of cylinder block 2, in a known manner, a gasket 3 being interposed between the block and the head. The block 2 includes a cylinder 4 in which a piston 5 reciprocates. The block 2 and the head 1 are cored out to permit circulation therethrough of a cooling medium, as is well understood in the art.

Figure 2:
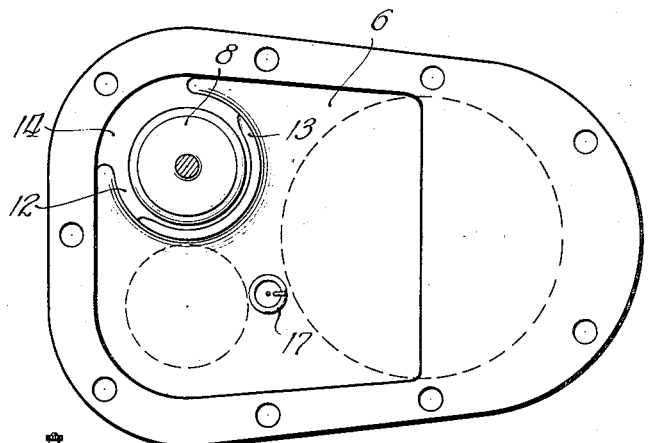
Fig. 2 is an underneath view of the head taken substantially in the plane of line 2—2 of Fig. 1.
Figure 3:
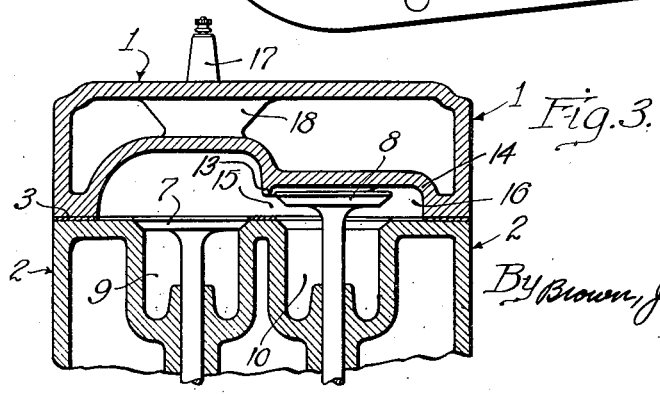
Fig. 3 is a section taken substantially in the plane of line 3—3 of Fig. 1.

Head 1 is provided with a combustion chamber 6 which, in the form illustrated in Figures 1 to 3, is substantially rectangular in plan. This combustion chamber overlies the inlet and exhaust valves 7 and 8, respectively, which control the inlet and exhaust passages 9 and 10, respectively, extending through the block 2 laterally thereof. The valves 7 and 8 are operated in a known manner which need not be illustrated nor described in detail.

The top wall or roof 11 of the combustion chamber 6 is provided with a downwardly offset portion forming a shoulder or shelf 12 above the exhaust valve 8. This shelf extends from the corner of the combustion chamber, as indicated at 14, is of substantially circular shape, and is provided, at its inner portion, with a depending peripheral flange 13.

The shelf 12 projects downwardly beyond the main portion of the top wall or roof of the combustion chamber for an appreciable distance, so that the valve 8, when in raised or open position, is disposed with the upper face of its head closely adjacent the under face of shelf 12, the valve head being disposed within a recess or pocket defined by shelf 12, flange 13, and the adjacent corner walls of the combustion chamber 6. With the valve thus disposed, on the exhaust stroke the hot exhaust gases flow through the opening 15 between flange 13 and the top of block 2 and then pass beneath the head of valve 8 into the exhaust passage 10. A portion of these hot exhaust gases passes about the end of the flange 13 and beneath the head of valve 8 adjacent neck 14. It is to be particularly noted that the hot exhaust gases flow around and under the valve contacting with the under face of the valve head only. This is a distinct advantage over the present practice in which the exhaust valve is not shielded and the hot exhaust gases flow across the top or upper face of the valve head, as well as under the head, both the top and the bottom of the valve head being exposed to the scrubbing action of the hot gases with a resulting high rate of heat transfer to the valve head.

By shielding the valve head, in the manner illustrated and above described, it is kept out of the path of flow of the hot exhaust gases with the result that the heat flow to the valve head is greatly reduced as compared to present practice.

It will be noted that the space 16 between the shelf 12 and the upper face of block 2 and valve 8 is very narrow, that is, is of little vertical height as compared to the height of the main combustion chamber 6. This provides a shielded area or space which has direct communication with the main combustion chamber 6 but such communication is sufficiently restricted to provide a shielding effect for the valve 8. As a result of this construction, the volume of gases exposed to radiation from the hot exhaust valve head, during the compression and firing of the charge, is reduced to a minimum. A further advantage of this construction is that the hot exhaust valve head is shielded from the general turbulence in the combustion chamber during the intake and compression strokes, thus minimizing the tendency to raise the temperature of the unburned charge by contact with the hot exhaust valve head.

Figure 4:
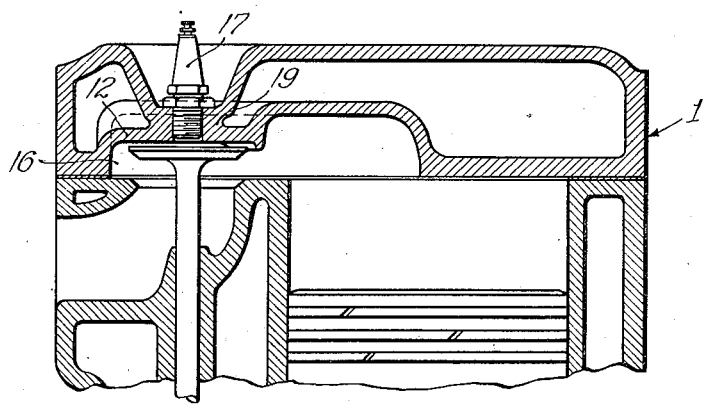
Fig. 4 is a view similar to Fig. 1 showing a slight modification thereof.

In Figures 1 and 2 I have shown a spark plug 17, mounted in a boss 18 of head 1, this spark plug being disposed to ignite the charge in the main combustion chamber 6. In Fig. 4 I have illustrated the head constructed in precisely the same manner as in Figures 1 and 2 with the exception that I provide a boss 19 which is formed integrally with shelf 12 and receives a spark plug 17 which is arranged coaxially with the exhaust valve 8. By arranging the spark plug in this manner, the charge is ignited in the shielded area or space 16 of the combustion chamber. From a practical standpoint, this disposal of the spark plug is important. With the spark plug disposed to ignite the charge in the shielded space, there is a marked increase in the smoothness of operation of the engine over that which occurs when the charge is ignited in the main combustion chamber 6. The rate of pressure rise during combustion shows a very distinct drop as compared to an engine in which the spark plug is disposed in the main part of the combustion chamber. The reason for this cannot be positively stated, though it may be due to slightly retarding the combustion by the provision of the restricted area or space 16.

Figure 5:
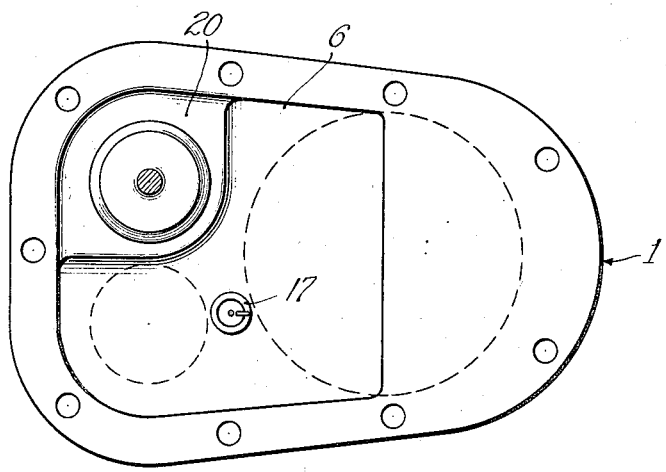
Fig. 5 is an underneath view of a modified form of head.

In the form illustrated in Fig. 5, the depending element or shelf 20 is of substantially rectangular outline and occupies one corner of the combustion chamber 6, the spark plug 17 being disposed in this main combustion chamber. In all other respects this form of head is similar to that illustrated in Fig. 1 with the exception that the flange about the depending shelf or barrier is omitted.

Figure 6:
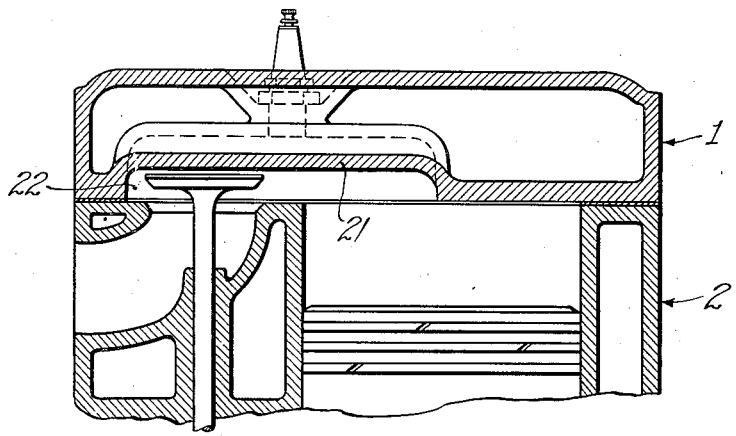
Fig. 6 is a fragmentary vertical sectional view through a second modified form of head and the upper portion of the cylinder block.
Figure 7:
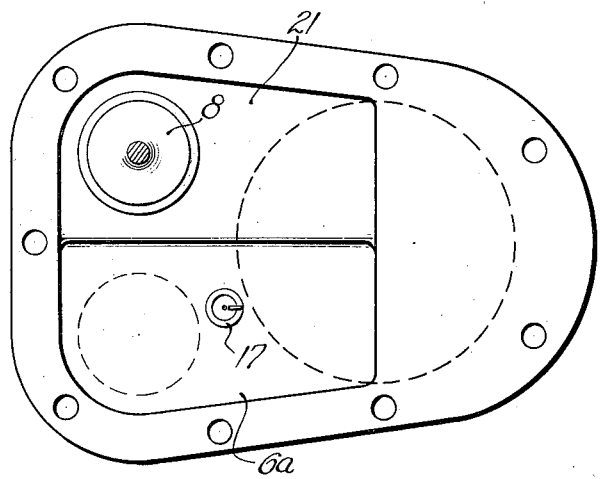
Fig. 7 is an underneath view of the head shown in Fig. 6.

In the form illustrated in Figures 6 and 7 I have shown approximately one-half of the top wall or roof of the combustion chamber 6a as depressed or extending downwardly to form a shelf 21 which extends from above the exhaust valve 8 inwardly over a portion of the cylinder area. The spark plug 17 is disposed in the main combustion chamber 6a. When the valve 8 is in its raised position it is disposed closely adjacent the under face of shelf 21 so that the exhaust gases pass beneath the head of the valve into the exhaust passage, the space between the upper face of the head of the valve and the shelf 21 being so narrow as to prevent the passage of any appreciable quantity of the exhaust gases over the upper face of the valve head.

The shelf 21 forms, with the valve 8 and the underlying portion of the upper face of the cylinder block 2, a restricted space or area forming a shielded space 22 which is effective as a barrier to protect the gases from the heat radiated from the hot exhaust valve head during the compression and firing of the charge, this shielded space also acting to shield the hot exhaust valve head from the general turbulence in the combustion chamber during the intake and compression strokes, as previously described. In all other respects the construction of the head is similar to that illustrated in Figures 1 to 3.

Figure 8:
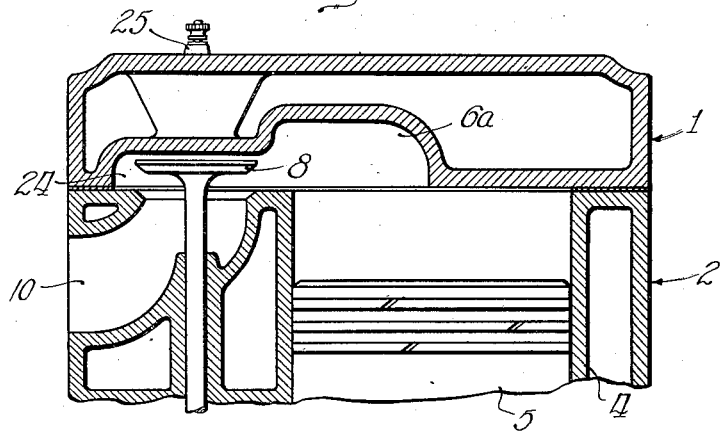
Fig. 8 is a fragmentary vertical sectional view through a third modified form of head and the upper portion of the cylinder block.
Figure 9:
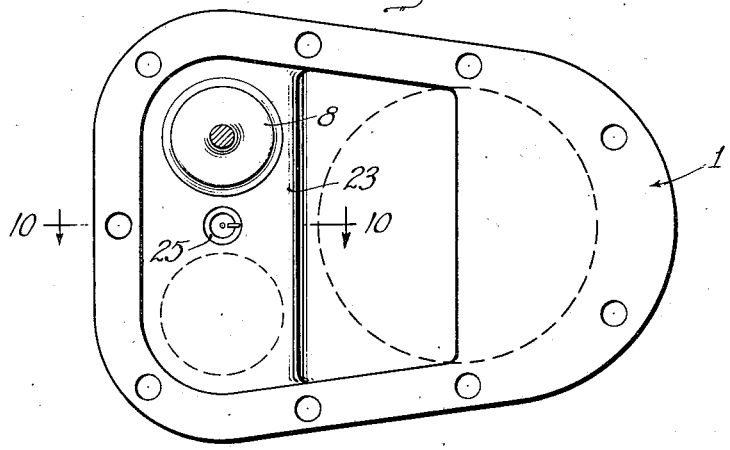
Fig. 9 is an underneath view of the head of Fig. 8.
Figure 10:
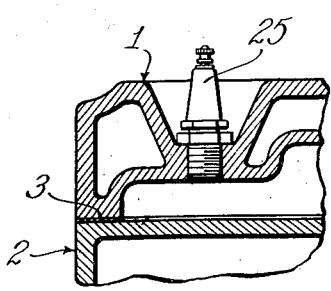
Fig. 10 is a section taken substantially on line 10—10 of Fig. 9.

In the modified form illustrated in Figures 8, 9 and 10, I have shown the head as provided with a shelf or depression 23 disposed above the inlet valve as well as the exhaust valve, this shelf being continuous from side to side of the combustion chamber and extending approximately one-half the length thereof, that is, one-half the distance from the outer end of the combustion chamber to the inner end thereof, in the direction of the cylinder. This shelf 23 extends downwardly an appreciable distance below the remaining portion of the top wall or roof of the combustion chamber so that the exhaust valve, when raised, is disposed closely adjacent the under face of the shelf which constitutes a barrier to the hot exhaust gases and causes them to flow beneath the head of the valve into the exhaust passage 10 in the manner previously described.

The shelf 23 forms, with the underlying upper surface of the block 2 and the inlet and exhaust valves, a shielded space 24 which is effective in shielding the hot exhaust valve head from the general turbulence in the combustion chamber during the intake and compression strokes, and reducing the volume of gases exposed to radiation from the exhaust valve head during compression and firing of the charge. In this form the spark plug 25 is disposed in the space 24 midway between the two valves. By igniting the charge in the shielded space 24 smoother operation of the engine is obtained, as previously described in connection with Fig. 4.

My invention is directed, broadly, to means for shielding the exhaust valve from the hot exhaust gases which, as above indicated, may be accomplished in a number of ways. I do not, therefore, limit myself to the precise construction shown since this result could be accomplished, possibly, by employing a combustion chamber of reduced height as compared to combustion chambers now in common use, and increasing the lift of the exhaust valve so as to dispose the head thereof closely adjacent the roof of the combustion chamber when this valve is raised. My invention comprehends, therefore, in its broader aspects, any means by which the exhaust valve, when in raised position, is so related to the roof of the combustion chamber as to be shielded from the hot exhaust gases.

What I claim is:

1. In an internal combustion engine, a cylinder, a piston reciprocating in the cylinder, inlet and exhaust passages, valves controlling said passages, and a head having a combustion chamber overlying the valves and a portion of the cylinder area, said head having a recess disposed and adapted for reception of the exhaust valve when the latter is in raised position.

2. In an internal combustion engine, a cylinder, a piston reciprocating in the cylinder, inlet and exhaust passages, valves controlling said passages, and a head having a combustion chamber overlying said valves and a portion of the cylinder area, the roof of the chamber having a depending shelf above the exhaust valve, the exhaust valve, when raised, being disposed adjacent said shelf and the shelf having a depending flange disposed to enclose the valve head.

3. In an L-head internal combustion engine, a block including a cylinder, a piston reciprocating in the cylinder, inlet and exhaust passages in the block, valves controlling said passages, and a head seating upon the block and having a combustion chamber overlying said valves and a portion of the cylinder area, the roof of the chamber having a depending shelf above the exhaust valve and forming therewith and with the adjacent portion of the block a pocket, the exhaust valve, when raised into said pocket, being disposed adjacent said shelf.

4. In an L-head internal combustion engine, a block including a cylinder, a piston reciprocating in the cylinder, inlet and exhaust passages in the block, valves controlling said passages, and a head seating upon the block and having a combustion chamber overlying the valves and a portion of the cylinder area, the roof of the chamber having a depending shelf above the valves and the intermediate portion of the block and forming therewith a pocket, the valves, when raised into said pocket, being disposed adjacent said shelf.

5. An internal combustion engine comprising in combination, a cylinder head or compression chamber forming the usual closure to and passage between the cylinder and the exhaust valve aperture, and characterized by the fact that the edge of the wall of the said chamber between the cylinder and the exhaust passage is adapted to form a baffle to the exhaust valve edge, whereby the latter is shielded from the intense and disintegrating effect of the hot exhaust gases and thus prevented from pitting and warping.

6. An internal combustion engine comprising in combination, a cylinder head or compression chamber forming the usual closure to and passage between the cylinder and the exhaust valve aperture and characterized by the fact that the said compression chamber is provided with a shallow circular recess opposite to the aperture of said valve and adapted to receive and embrace the disk head of said valve and so proportioned that the edge of the said recess provides a baffle which is adapted to shield the said disk from the effects of the hot exhaust gases passing from the cylinder to the said valve aperture whereby this gaseous stream is guided more efficiently into the exhaust passage.

7. In internal combustion engines having a cylinder block provided with an exhaust passage terminating at the top in a valve seat, and having a piston chamber adjacent the exhaust passage and having a poppet valve cooperating with said seat, and a cylinder head fitting over said block through which head the exhaust gases pass to the exhaust passage from the piston chamber; the combination with the aforesaid structure of a projection in the cylinder head between the piston chamber and the exhaust passage and a pocket in the cylinder head to receive the head of the valve when raised and to deflect the gases from the piston chamber to the exhaust passage beneath the head of the valve for the purposes described.

8. In internal combustion engines, a cylinder block having a working chamber, a cylinder head, a valve controlled exhaust passage over which said cylinder head projects, combined with means to shield the valve head from the exhaust gases in flowing from the working chamber of the cylinder into the exhaust passage while said valve is open, said means including a pocket in the cylinder head to receive the head of the valve while the valve is in the open position.

9. In internal combustion engines, a cylinder block having a working chamber, a cylinder head, a valve controlled exhaust passage over which said cylinder head projects, combined with means to shield the valve head from the exhaust gases in flowing from the working chamber of the cylinder into the exhaust passage while said valve is open, said means including a pocket in the cylinder head to receive the head of the valve while the valve is in the open position, and a projection from the cylinder head toward the cylinder block which is shaped to deflect the exhaust gases beneath the head of the exhaust valve downwardly toward the exhaust passage.

10. In an internal combustion engine, a block including a cylinder, a piston reciprocating in the cylinder, inlet and exhaust passages in the block, valves controlling said passages, a head seating upon the block and having a recess forming a relatively deep combustion space overlying said valves and a portion of the cylinder area, the head lying in close proximity to the piston in its uppermost position throughout the remainder of the cylinder area, the roof of the recess being depressed over the exhaust valve to form a pocket.

11. In an internal combustion engine, a cylinder having a combustion chamber of the L-head type for said cylinder, a water-jacket for said cylinder, inlet and exhaust valves for said combustion chamber, means for operating said valves, said operating means being adapted to move said exhaust valve to a position in proximity to a water-cooled wall of said combustion chamber, whereby the major portion of the stream of exhaust gas flowing out through the exhaust valve will come in contact with one side only of the said valve.

12. In an internal combustion engine, means forming a combustion chamber, inlet and exhaust valves arranged side by side in said chamber, a pocket in said chamber above said inlet valve, a spark plug projecting into said pocket and a smaller pocket for said exhaust valve adjacent to and having a side opening into the inlet valve pocket.

13. In an internal combustion engine, means forming a combustion chamber, a water-jacket for said combustion chamber, an exhaust valve for said chamber, said valve being of the poppet type and opening by movement into said chamber, a water-cooled wall of said chamber having a portion substantially parallel and closely adjacent to the top of said valve when the valve is open.

14. In an internal combustion engine of the L-head type, a combustion chamber of substantial triangular cross-section and having its volume distributed between three portions of different depth, the inlet valve being in one corner of the triangle adjacent the portion of greatest depth, the exhaust valve being at another corner of the triangle, and that portion being of intermediate depth, and the top of the engine piston being at the third corner of the triangle and adjacent the portion of least depth.

15. In an internal combustion engine of the L-head type, a combustion chamber having inlet and exhaust valves opening into the said chamber, said chamber having a portion of great depth adjacent the inlet valve and a portion of less depth adjacent the exhaust valve, said portions of the combustion chamber being in direct communication, said chamber having a third portion of less depth than that portion adjacent the exhaust valve, said third portion being directly adjacent the piston of the engine when it is at the top of its stroke.

16. An internal combustion engine including in combination a cylinder with poppet valve controlled inlet and exhaust ports at the side thereof, a cylinder head providing a combustion chamber overlying said ports and a portion of said cylinder, said cylinder head being of materially less depth adjacent said exhaust port than adjacent said inlet port, the depth of said combustion chamber adjacent said exhaust port being not materially greater than that required to afford clearance for the exhaust valve in the opened position of the latter.

17. In an internal combustion engine, a block including a cylinder, a piston reciprocating in the cylinder, inlet and exhaust passages in the block, valves controlling said passages, and a head seating upon the block and having a recess forming a relatively deep combustion space overlying said valves and a portion of the cylinder area, the space between the piston in its uppermost position and the head throughout the remainder of the cylinder area being relatively shallow, and a portion of the roof of said recess being depressed to form a pocket.

ARTHUR W. POPE, Jr.